United States Patent
Shimizu

(10) Patent No.: US 7,905,151 B2
(45) Date of Patent: Mar. 15, 2011

(54) SNAP CHUCK

(75) Inventor: Toru Shimizu, Tokyo (JP)

(73) Assignee: YKK Corporation (JP)

( * ) Notice: Subject to any disclaimer, the term of this patent is extended or adjusted under 35 U.S.C. 154(b) by 0 days.

(21) Appl. No.: 12/606,777

(22) Filed: Oct. 27, 2009

(65) Prior Publication Data

US 2010/0043565 A1 Feb. 25, 2010

Related U.S. Application Data

(62) Division of application No. 12/138,624, filed on Jun. 13, 2008, now Pat. No. 7,866,217.

(30) Foreign Application Priority Data

Jun. 20, 2007 (JP) ................... 2007-162804

(51) Int. Cl.
*G01N 3/00* (2006.01)
*G01N 3/008* (2006.01)

(52) U.S. Cl. .......................................... 73/833

(58) Field of Classification Search ............ 73/760–860; 279/61–62
See application file for complete search history.

(56) References Cited

U.S. PATENT DOCUMENTS

| | | | | |
|---|---|---|---|---|
| 4,637,620 A | * | 1/1987 | Graham et al. | 279/127 |
| 4,722,536 A | * | 2/1988 | Lane et al. | 279/123 |
| 5,798,467 A | | 8/1998 | Hasegawa et al. | |
| 6,637,756 B2 | * | 10/2003 | McCurry | 279/61 |
| 6,991,238 B2 | * | 1/2006 | Yang et al. | 279/62 |
| 7,152,489 B2 | | 12/2006 | Hasegawa | |
| 7,157,152 B2 | | 1/2007 | Urata et al. | |
| 2002/0007545 A1 | | 1/2002 | Raccosta et al. | |
| 2009/0306485 A1 | | 12/2009 | Bell | |

FOREIGN PATENT DOCUMENTS

JP 09-037811 2/1997
WO 03/102525 12/2003

* cited by examiner

*Primary Examiner* — Max Noori
(74) *Attorney, Agent, or Firm* — Kilpatrick Townsend & Stockton LLP

(57) ABSTRACT

A device and method for measuring snap member detaching force, the snap member detaching force measurement device includes a cloth holding unit for holding cloth on the periphery of the snap member attached to the cloth; a snap chucking unit for chucking the snap member from its side portion by a plurality of chucking portions of the unit; a torque gauge for applying torque to the snap member chucked by the chucking portions; a tension unit for relatively pulling the snap member from the cloth; and a tensile force gauge for measuring tensile force provided by the tension unit. The snap chucking unit includes turning arms which can lock, with constant chucking force, the state of the snap member chucked by the chucking portions.

4 Claims, 12 Drawing Sheets

SNAP CHUCK

CLAIM OF PRIORITY

This divisional application claims the benefit of priority, under 35 U.S.C. 121, of U.S. patent application Ser. No. 12/138,624, filed Jun. 13, 2008, which claims the benefit of Japanese Patent Application No. 2007-162804, filed Jun. 20, 2007, the disclosures of each are incorporated by reference herein in their entirety.

BACKGROUND OF THE INVENTION

1. Field of the Invention

The present invention relates to a device and method for measuring snap member detaching force, and a snap chuck. More particularly, the present invention relates to a device and method for applying torque to a snap member attached to cloth of, for example, a garment and then measuring force to detach the snap member from the cloth, and a snap chuck for use in such a detaching force measuring test.

2. Description of the Related Art

Snap fasteners are used in garments, bags, etc. in large quantities. The snap fastener is structured so that a male snap member called a stud member is elastically engaged/unengaged with a female snap member called a socket member (these male and female snap members are generically called a snap member, and include those intended for decoration unless engaged/unengaged). The snap fasteners are generally attached onto one and another surfaces of cloth of a garment etc. which are overlaid each other. In this case, as shown in FIG. 10, a female snap member 1 and a male snap member 2 are fixed to clothes 5, 6 by penetrating a plurality of projections of attachment members 3, 4 called prong members from sides opposite to the surfaces of the clothes 5, 6 facing each other, and then swaging the projections within the outer peripheral parts of the female and male snap members 1, 2.

As small children might swallow the snap members or the attachment members if the snap members attached to the cloth of a garment etc. easily come off, it is necessary to ensure that force to detach the snap members from the cloth is equal to or more than a certain value. Thus, in e.g. sewing plants, the snap member detaching force is inspected and managed so that it is equal to or more than the certain value. In addition, sewing companies in various countries observe the European standard "BS EN71-1: Safety of Toy, Mechanical and physical properties" in which force to detach snap members from cloth is defined to be equal to or more than "90 N for ten seconds".

Conventional snap member detaching force measurement devices are disclosed in, for example, Japanese Patent Publication Laid-open No. 9-37811 and WO03/102525A1. Such a device comprises cloth holding means for holding cloth around a snap member attached to the cloth, snap chucking means (binding means) for chucking the snap member from its side portion, tension means for pulling the snap member chucked by the snap chucking means from the cloth held by the cloth holding means, and measuring means for measuring the tensile force.

The above snap chucking means includes three jaws whose distal ends are engaged with the side portion of the snap member, a jaw support member for supporting the distal engaging portions of the jaws so that these portions can displace (open/close) inwardly/outwardly in the radial direction of the snap member via a shaft member, and a jaw open/close driving member for putting in and out a tapered portion of the driving member between the jaws from above to open/close the jaw distal engaging portions. Moreover, the snap member is chucked by the jaw distal engaging portions by urging the jaw open/close driving member downward using a spring (spring type) or by moving the jaw open/close driving member which is screwed to a threaded bolt downward along the bolt (screw type).

[Patent document 1] Japanese Patent Publication Laid-open No. 9-37811
[Patent document 2] WO03/102525A1

SUMMARY OF THE INVENTION

However, even in the case of the snap member for which detaching force is ensured in a tension test by the conventional devices described above, the snap member may easily come off if it is only slightly rotated (turned) with respect to the cloth (or to the attachment member), which can lead to an accident where small children swallow the snap member.

Therefore, a first object of the present invention is to provide a device and method for measuring snap member detaching force which can ensure the detaching force after torque has been applied to a snap member, and to provide a snap chuck for use in such a detaching force measuring test.

Furthermore, the problem of the above-mentioned spring type snap chucking means is that when torque is provided to the above-mentioned jaws chucking the snap member so as to apply the torque to the snap member, necessary torque can not be applied because the jaws slip on the side portion of the snap member, and even the increase of spring force fails to achieve constant chucking force and results in variations in a torque application process. On the other hand, the problem of the screw type is that an operator tends to firmly tighten the jaw open/close driving member so that the jaws do not slip on the snap side portion. In this case, the snap member tends to deform, which leads to decreased accuracy of the subsequent tension test. Further, operating efficiency is low because the jaw open/close driving member is moved up and down along the threaded bolt while being rotated, and moreover, it is again impossible to obtain constant chucking force.

Therefore, a second object of the present invention is to provide a device and method for measuring snap member detaching force which make it possible to easily obtain constant and firm chucking force for a snap member during the application of torque, and to provide a snap chuck for use in such a detaching force measuring test.

According to the present invention, there is provided a device which measures force to detach a snap member attached to cloth, the device comprising: cloth holding means for holding the cloth on the periphery of the snap member attached to the cloth; snap chucking means for chucking the snap member from its side portion by a plurality of chucking portions; torque applying means for applying torque to the snap member chucked by the snap chucking means; tension means for relatively pulling the snap member chucked by the snap chucking means from the cloth held by the cloth holding means; and measuring means for measuring tensile force provided by the tension means.

In the present invention, the tension test of the snap member can be run after torque (torsion) has been applied to the snap member by the torque applying means, so that it is possible to ensure detaching force after the application of the torque to the snap member. As the torque applying means, it is possible to preferably use, for example, a torque gauge which can apply torque to the snap member via the chucking portions of the snap chucking means, and it is also possible to use a torque wrench. As a torque application test, ones approved by an examining authority can be used, in which, for instance, one of the following is determined or practiced; a) whether or not a snap member can turn 180 degrees from its initial position, b) whether or not a torque value can reach a predetermined value (e.g., 0.56 N-m), or c) applying clockwise torque to a snap member gradually for five seconds until maximum rotation or the above-mentioned predetermined torque value is maintained for ten seconds.

In one embodiment of the present invention, the snap chucking means includes a lock mechanism which can lock, with constant chucking force, the state of the snap member chucked by the chucking portions. By using the lock mechanism, it is possible to easily achieve constant chucking force to chuck the snap member by the chucking portions of the chucking means during the torque application, such that variations in the torque application test can be decreased or eliminated and operating efficiency can be increased. The lock mechanism enables constant chucking force to be obtained by a fixed constant chucking diameter (closed diameter; slightly smaller than the diameter of a snap member) at which the chucking portions chuck the snap member. A specific example of this will be described in the section DETAILED DESCRIPTION OF THE INVENTION.

In one embodiment of the present invention, the snap chucking means includes an elastic member which pushes the chucking portions against the side portion of the snap member, and the lock mechanism, in a locked state, can reinforce the force of the chucking portions to chuck the snap member by the elastic member. In this case, if the snap member is chucked by the chucking portions through elastic force alone, the chucking portions may slip on the snap side portion during the torque application or the chucking force is not stabilized. However, the lock mechanism permits constant chucking force while reinforcing the elastic force.

In one embodiment of the present invention, the lock mechanism includes chucking force adjustment means for enabling the chucked state to be locked by a plurality of kinds of chucking force corresponding to a plurality of kinds of diameters of the snap members. This chucking force adjustment means makes it possible to easily obtain constant chucking force optimum for the snap members different in diameter.

According to another invention, there is provided a snap chuck which chucks a snap member attached to cloth from its side portion, the snap chuck comprising: a plurality of chucking members for chucking the side portion of the snap member by chucking portions of the chucking members; and a lock mechanism which can lock, with constant chucking force, the state of the snap member chucked by the chucking portions of the chucking members. This snap chuck is designed to be used as the snap chucking means in the above-mentioned snap member detaching force measurement device according to the present invention. The snap chuck includes an elastic member which pushes the chucking portions of the chucking members against the side portion of the snap member, and the lock mechanism, in a locked state, can reinforce the force of the chucking portions to chuck the snap member by the elastic member. Moreover, the lock mechanism can include chucking force adjustment means for enabling the chucked state to be locked by a plurality of kinds of chucking force corresponding to a plurality of kinds of diameters of the snap members.

According to still another invention, there is provided a method of measuring force to detach a snap member attached to cloth, the method comprising the steps of: holding the cloth on the periphery of the snap member attached to the cloth; applying torque to the snap member the cloth around which is held; relatively pulling the snap member from the cloth thereAround after cancellation of the torque; and measuring the tensile force. In the present invention, the tension test of the snap member can be run after the torque has been applied to the snap member in the torque application step, so that it is possible to ensure detaching force after the application of the torque to the snap member. The method further includes the steps of: chucking the snap member from its side portion by a plurality of chucking portions before the torque application step; and locking, with constant chucking force, the state of the snap member chucked by the chucking portions, wherein the torque application step can include applying torque to the chucking portions and transmitting the torque to the snap member.

DETAILED DESCRIPTION OF THE INVENTION

Figure 1:
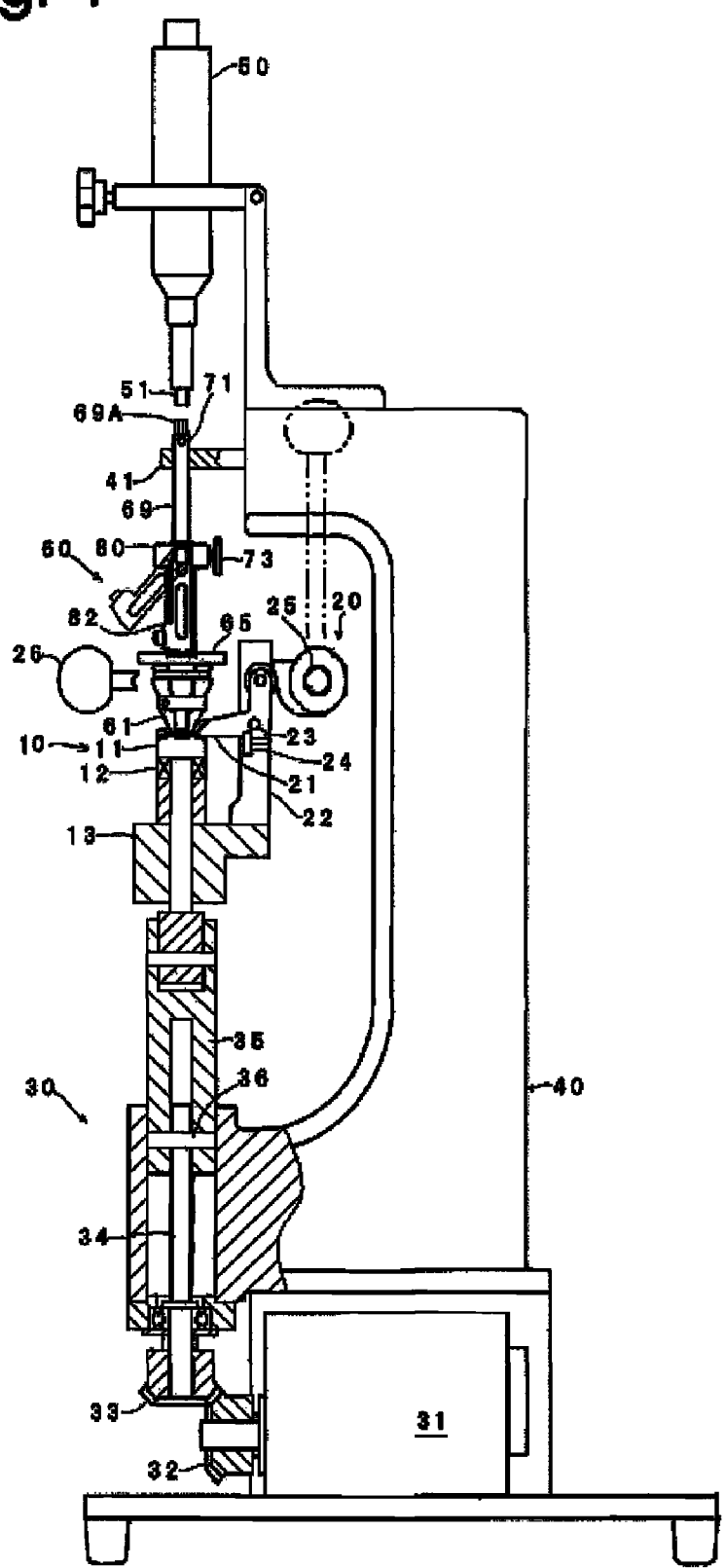
FIG. 1 is a diagram of the whole configuration of a snap member detaching force measurement device according to the present invention.
Figure 10:
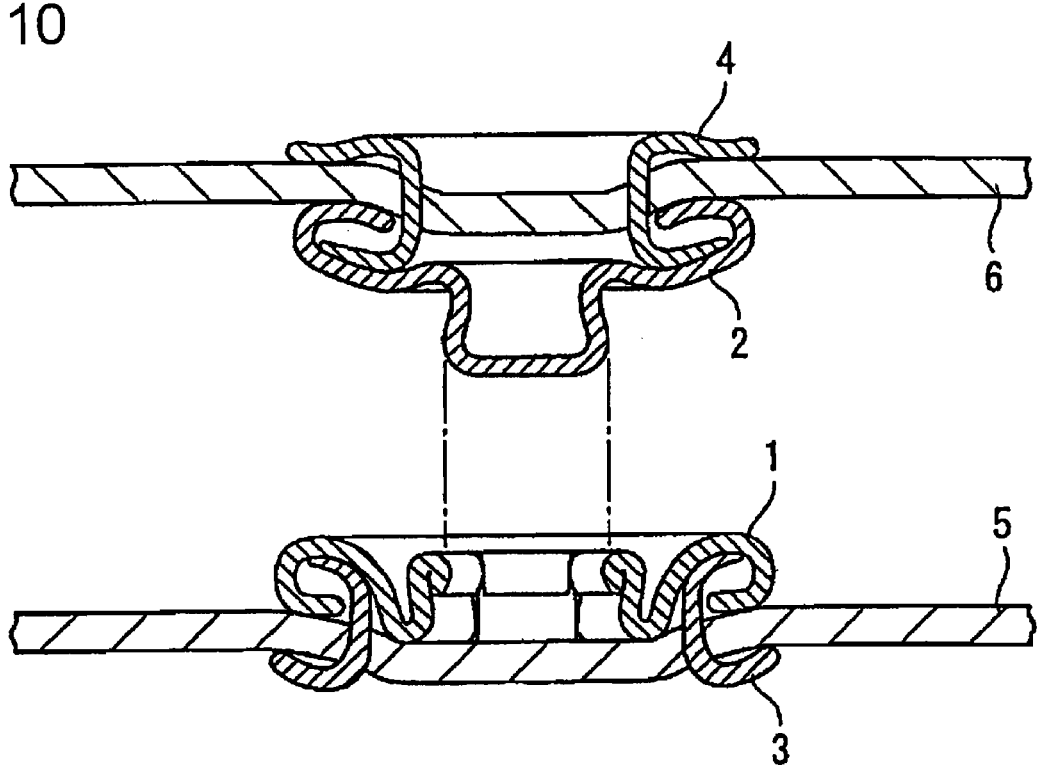
FIG. 10 is an explanatory sectional view showing how a male snap and a female snap are attached to clothes.

A preferred embodiment of the present invention will hereinafter be described with reference to the drawings. FIG. 1 is a diagram of the whole configuration of a snap member detaching force measurement device according to one embodiment of the present invention. This measurement device comprises a stage 10 including a die 11 on which a snap member (see FIG. 10, etc) attached to cloth is mounted, a cloth holding unit 20 for holding part of the cloth around the snap member on the die 11 by a cloth holding arm 21; a snap chucking unit 60 for chucking the snap member from its side portion by three jaws 61, a commercially available torque gauge 50 as torque applying means for applying torque to the snap member via the jaws 61 of the snap chucking unit 60 etc., a tension unit 30 for immobilizing the side of the snap member chucked by the jaws 61 in order to relatively pull the snap member from the cloth, and for lowering the side of the cloth held by the cloth holding arm 21 together with the stage 10 and the cloth holding unit 20, a tensile force gauge (not shown) as measurement means for measuring the tensile force provided by the tension unit 30, and a support frame 40 for supporting the above configuration. Although described later in detail, the snap chucking unit 60 includes a lock mechanism which can stabilize chucking force to a constant level while reinforcing the state of the snap member being chucked by the jaws 61.

The stage 10 has a support block 13 for supporting the die 11 via an elastic spring portion 12. The elastic spring portion 12 is composed of a plurality of leaf springs stacked alternately in opposite directions. The cloth holding unit 20 shares the support block 13 as a support base with the stage 10. Although the unit 20 is not described in detail because it is substantially similar to the cloth holding means disclosed in WO03/102525A1, in the unit 20, the substantially L-shaped cloth holding arm 21 is swingably supported via a support shaft 23 at the upper end of a support member 22 extending upward from the support block 13, and a spring 24 is provided between the support member 22 and the arm 21 to urge the arm 21 in a direction in which the distal end of the arm 21 moves away from the upper surface of the die 11. When a lever 26 coupled to a turning shaft 25 is turned in one direction (counterclockwise direction), the cloth is held by the arm 21 against the urging of the spring 24 via an unshown cam action. When the lever 26 is turned in the other direction, the holding is cancelled.

As the present device is configured so that torque is transmitted to the snap member from the torque gauge 50 located above (described later), the tension unit 30 is configured so that the cloth is pulled downward with respect to the fixed snap member. The tension unit 30 comprises a motor 31, a trapezoidal thread 34 which rotates on receipt of the output of the motor 31 via bevel gears 32, 33, and a cylindrical shaft 35 which is screwed at its end to the trapezoidal thread 34 and which descends along with the rotation of the trapezoidal thread 34. The shaft 35 is coupled to a stage 10 and the support block 13 of the cloth holding unit 20. In use, the snap member on the die 11 is disposed in concentric with the axis of the trapezoidal thread 34 and the shaft 35. The rotation of the shaft 35 during ascending/descending is prevented by a rotation stopper 36.

Figure 2:
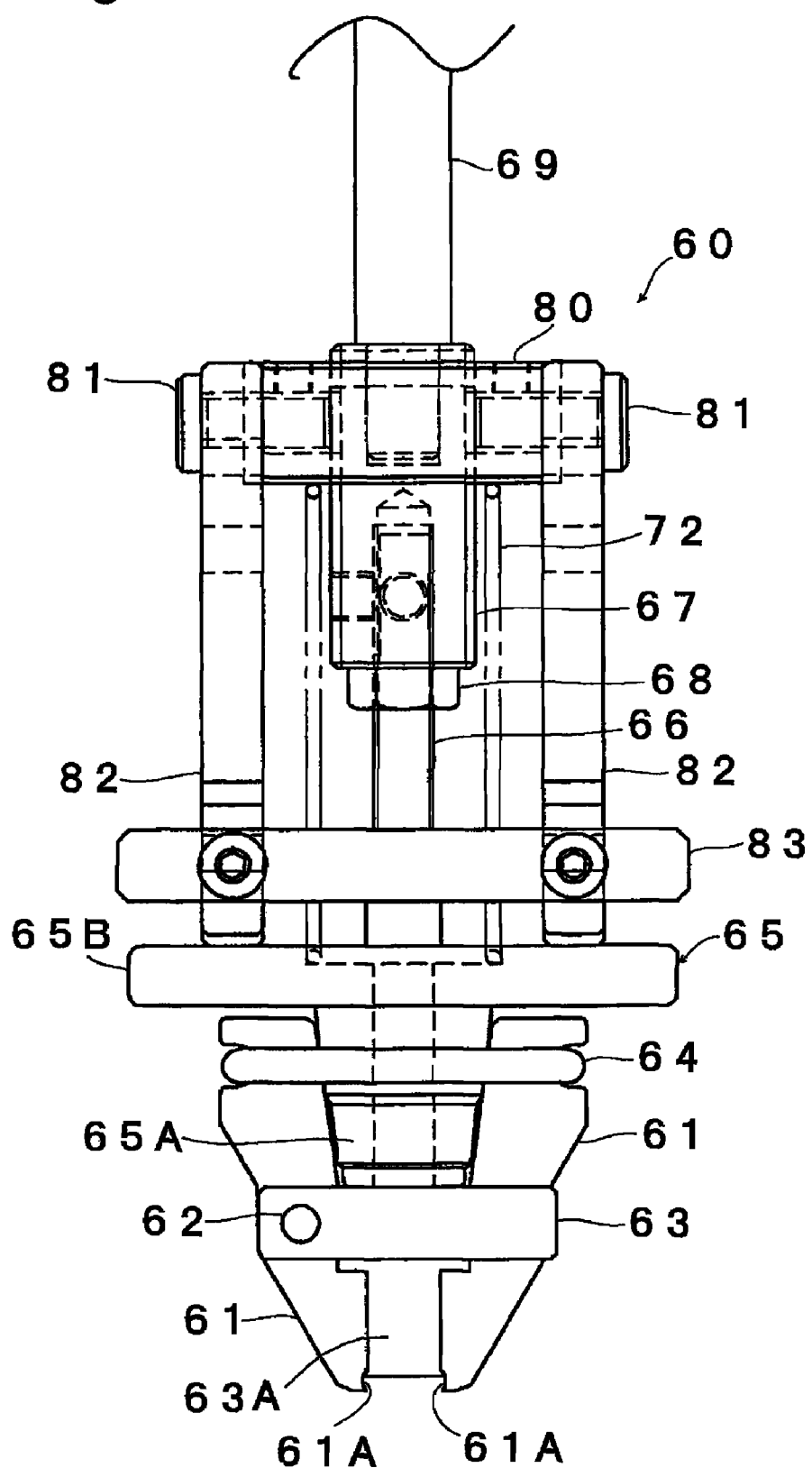
FIG. 2 is an elevation view of a snap chucking unit.

Referring to FIGS. 2 to 5, the snap chucking unit 60 includes: a jaw support plate 63 which supports the three jaws 61 arranged at predetermined angular intervals in a circumferential direction so as to oscillate or turn at the center of support shafts 62 so that the jaws 61 can be opened/closed (radial outward/inward displacement of the snap member) into an open diameter state in which chucking portions 61A at the distal ends of the jaws are away from each other and into a closure diameter state in which the chucking portions 61A are brought close to each other; a spring (may otherwise be, for example, an O-ring) 64 which urges the proximal ends of the jaws 61 radially inwardly so that the chucking portions 61A are to be opened; and a jaw open/close driving member 65 which displaces the proximal ends of the jaws radially outwardly against the urging of the spring 64 to close the chucking portions 61A. The jaw support plate 63 and a member indicated by the reference number 63A in FIG. 2 are coupled to the lower end of a threaded lower rod 66, and the member 63A serves to hold the snap member downward to prevent the upward movement of the snap member pinched by the jaws 61. The upper end of the lower rod 66 is fixed to a rod coupling member 67 by a nut 68 etc. At this point, the fixing position of the lower rod 66 to the rod coupling member 67 can be adjusted by the nut 68. Further, the lower end of an upper rod 69 is coupled to the rod coupling member 67 by a pin 70.

The upper rod 69 has at its upper end d 69 a joint 69A which can engage with a sectionally hexagonal output portion 51 of the torque gauge 50 In use, the upper rod 69, the rod coupling member 67 and the lower rod 66 are vertically arranged concentrically with the snap member on the die 11, forming a torque transmission path for transmitting the torque from the torque gauge 50 to the jaw support plate 63. Moreover, the upper rod 69 is received in the vicinity of its upper end by a rod end 41 (see FIG. 1) extending from the support frame 40. At immediately above the rod end 41, a pin 71 which diametrically penetrates the upper rod 69 is supported by the rod end 41, and therefore the loads of the upper rod 69 and the chucking unit structure coupled below the rod 69 are supported by the support frame 40.

Figure 6:
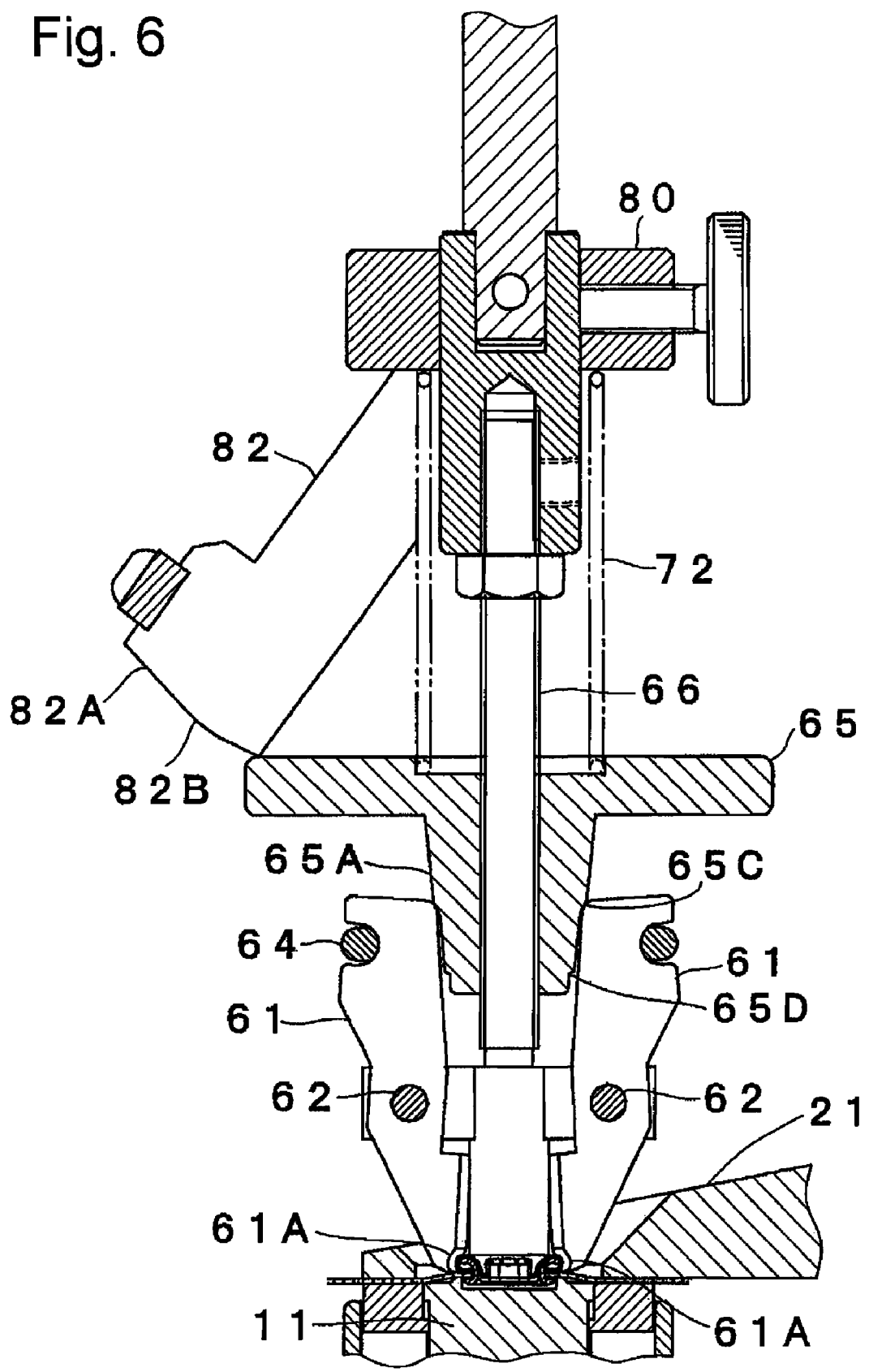
FIG. 6 is an explanatory side view showing a state before chucking a snap and before locked state.

The jaw open/close driving member 65 has a tapered portion 65A which is inserted between the jaws 61 and which gradually reduces in outside diameter downward, and an upper collar 65B, and the collar 65B receives on its upper surface the lower end of a spring 72 which urges the jaw open/close driving member 65 downward. The upper end of the spring 72 is received on the lower surface of a lock mechanism support plate 80 which is fixed to the rod coupling member 67 by a position fixing screw 73. In addition, the spring 72 has a coil shape, and is be wound around the lower rod 66. The jaw open/close driving member 65 can be moved upward along the lower rod 66 (not screwed to this lower rod 66) by the manual operation of an operator against the urging of the spring 72. Moreover, the tapered portion 65A includes two steps 65C, 65D, and these steps 65C, 65D can be engaged with the inner sides of the proximal ends of the jaws so as to immobilize the jaw open/close driving member 65 (see FIG. 6). This immobilized state can be cancelled when the operator applies downward force to the jaw open/close driving member 65.

Next, the lock mechanism will be explained. The lock mechanism includes two turning (or swinging) arms 82 which are oscillatably or turnably supported by two support shafts 81 diametrically provided in the lock mechanism support plate 80. The proximal ends of these turning arms 82 are supported by the lock mechanism support plate 80 at right and left positions sandwiching the lower rod 66, and their distal sides of the arms 82 are coupled to each other by a coupling member 83 such that the arms 82 always move together. A distal surface 82A of the turning arm 82 is gently concavely shaped in its width direction perpendicular to its length direction (arm radial direction), and the distance between its apex 82B and the center of the support shaft 81 is defined as the arm radius. Thus, while the turning arm 82 turns, the apex 82B smoothly contacts the upper surface of the collar 65B of the open/close driving member 65, applying force to gradually push down the open/close driving member 65. Further, the arm radius of the turning arms 82 and the position of the lock mechanism support plate 80 with respect to the lower rod 66 can make a insertion degree of the tapered portion 65A of the jaw open/close driving member 65 into between the jaws 61 immovable, when the distal surfaces 82A of the turning arms 82 contact the upper surface of the collar 65B and push down the collar 65B to the position where the turning arms 82 are placed at vertical positions (locked positions) with respect to the upper surface of he collar 65B. In the vertical positions, the arm longitudinal axial line (the line between the apex 82B and the center of the support shaft 81) is parallel with the axis of the lower rod 66 (See FIG. 8). At this point, since the distal surfaces 82A of the arms 82 contact the collar 65B at the right and left positions sandwiching the lower rod 66, the force to push down the collar 65B can be horizontally equal. The closure diameter of the jaw chucking portions 61A determined in the locked positions is set so that the side portion of the snap member is firmly tightened to the extent that this side portion is not deformed and so that the chucking portions 61A do not slip on the snap side portion when torque is transmitted. In this locked state, the closure diameter of the chucking portions 61A is constant and slightly smaller than the diameter of the snap member, and the force to chuck the snap member by the chucking portions 61A is also constant. This locked state can be easily cancelled, for example, by holding and lifting up the coupling member 83 to displace the arms 82 from the locked positions.

Figure 3:
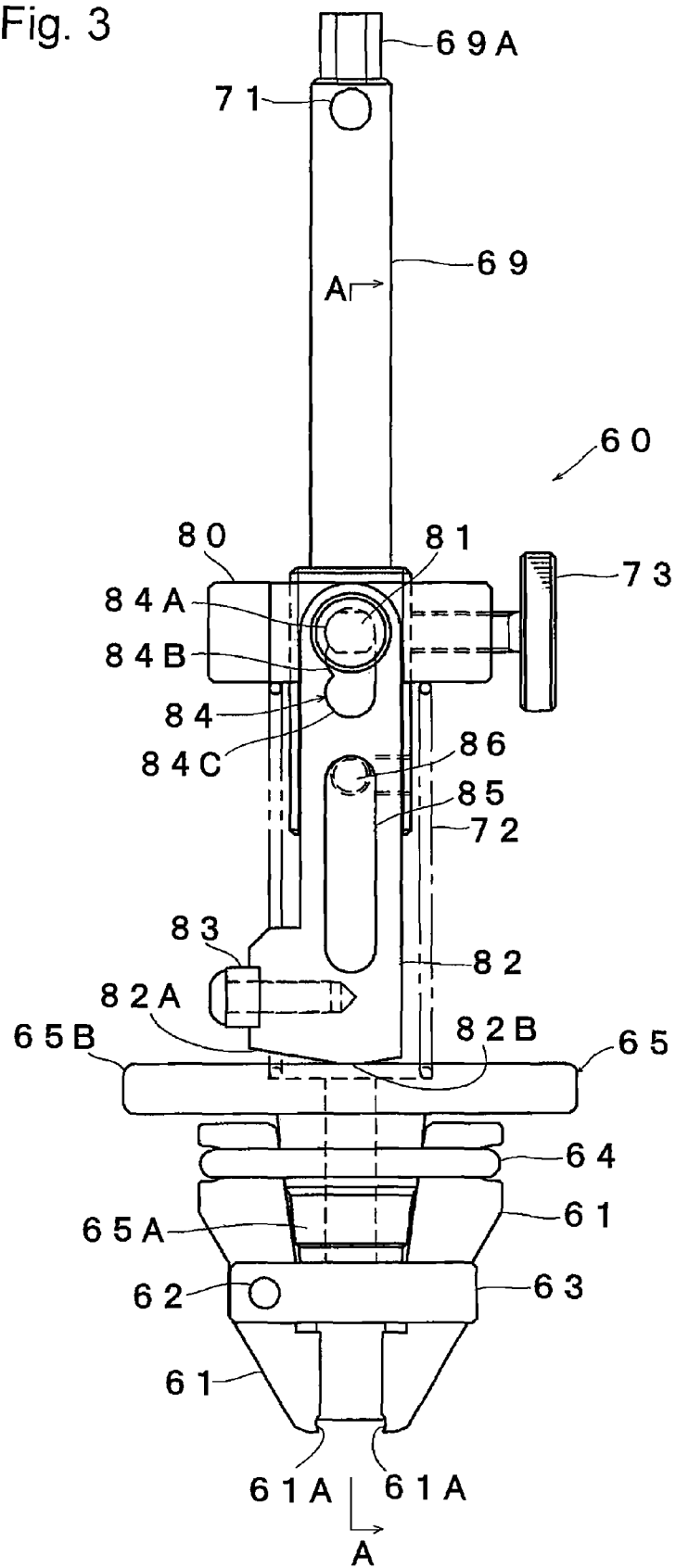
FIG. 3 is a side view of the snap chucking unit.
Figure 4:
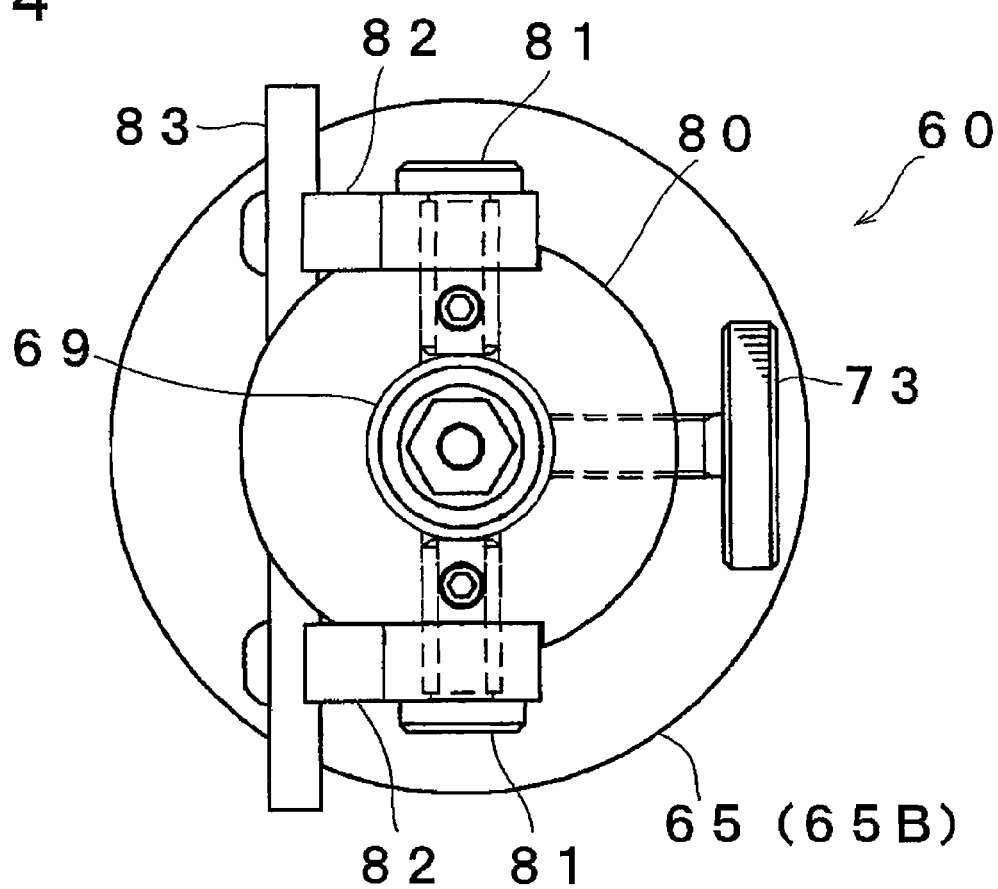
FIG. 4 is a plan view of the snap chucking unit.
Figure 5:
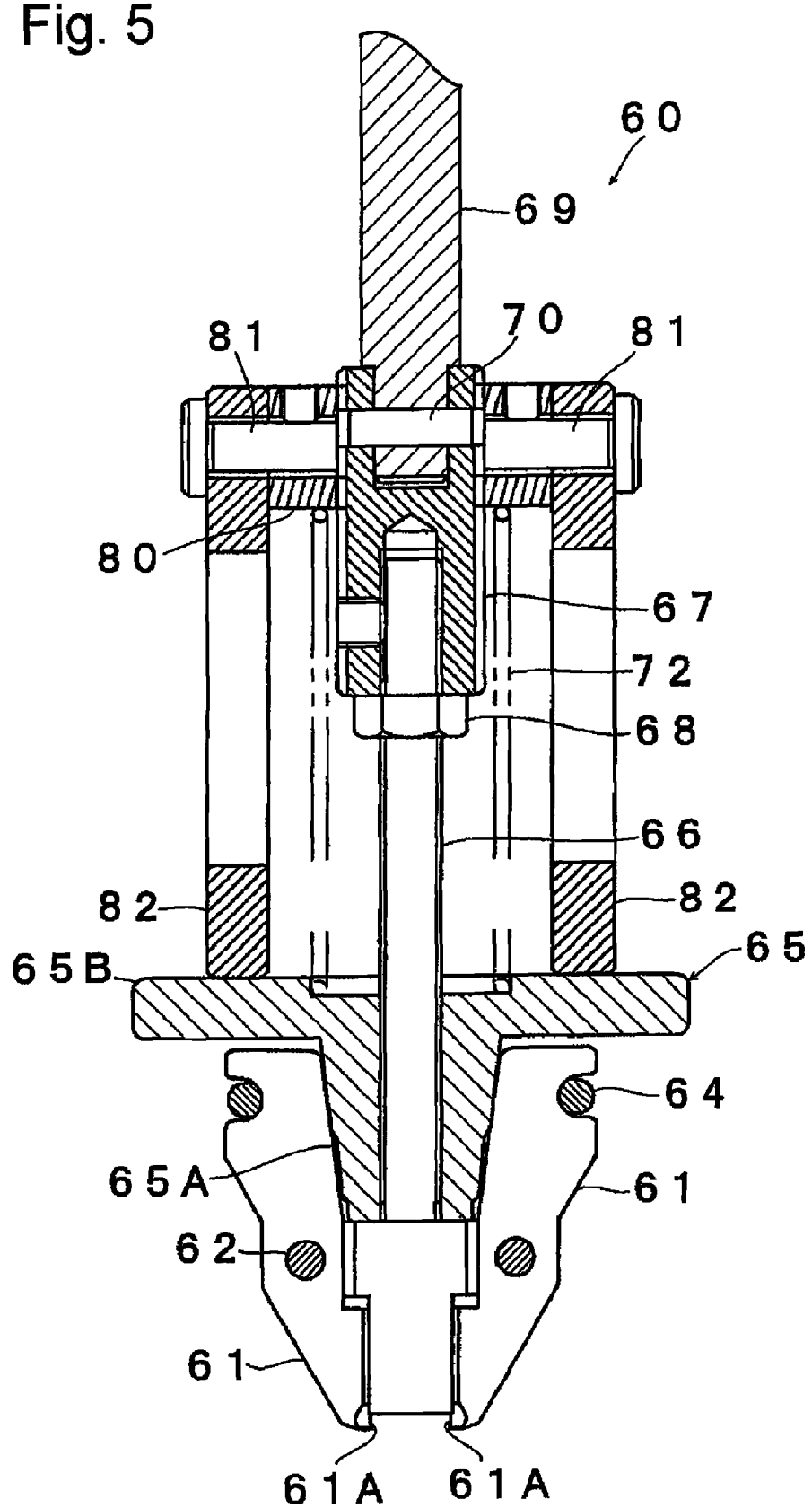
FIG. 5 is a sectional view of the snap chucking unit taken along the A-A line in FIG. 3.

Furthermore, there is provided an arm diameter adjuster which can change the center of the turning of the arms 82 so that the arm radius of the arms 82 can be adjusted in accordance with the diameter of the snap member. The arm diameter adjuster is substantially composed of the support shafts 81 and an opening 84 at the proximal side of each of the arms 82 for receiving the support shafts 81. Each support shaft 81 can be relatively displaced in the opening 84 so that the support shaft 81 can be positioned at a predetermined position within the opening 84. More specifically, as shown in FIG. 3, the support shaft 81 has a section in which circular upper and lower portions were horizontally cut off, and on the other hand, while the opening 84 is shaped so that a plurality of circular open portions 84A, 84B, 84C are sequentially arranged while partly overlapping each other in the arm longitudinal direction. Thus, each of the support shafts 81 is not uncoupled from one of the circular open portions 84A, 84B, 84C of the opening 84 in a normal arm usage range, but if the arms 82 are lifted horizontally, the support shafts 81 can be relatively displaced to the other adjacent circular open portions of the opening 84 to change the arm radius stepwise. In addition, it is preferable that three circular open portions continue from each other so that the arm radius can be changed at three degrees in accordance with large, medium and small sizes of the diameters of the snap members. Moreover, long holes 85 (see FIG. 3) provided in the turning arms 82 are used to tighten or loosen screws 86 in order to adjust the position of the lower rod 66 with respect to the rod coupling member 67.

Figure 8:
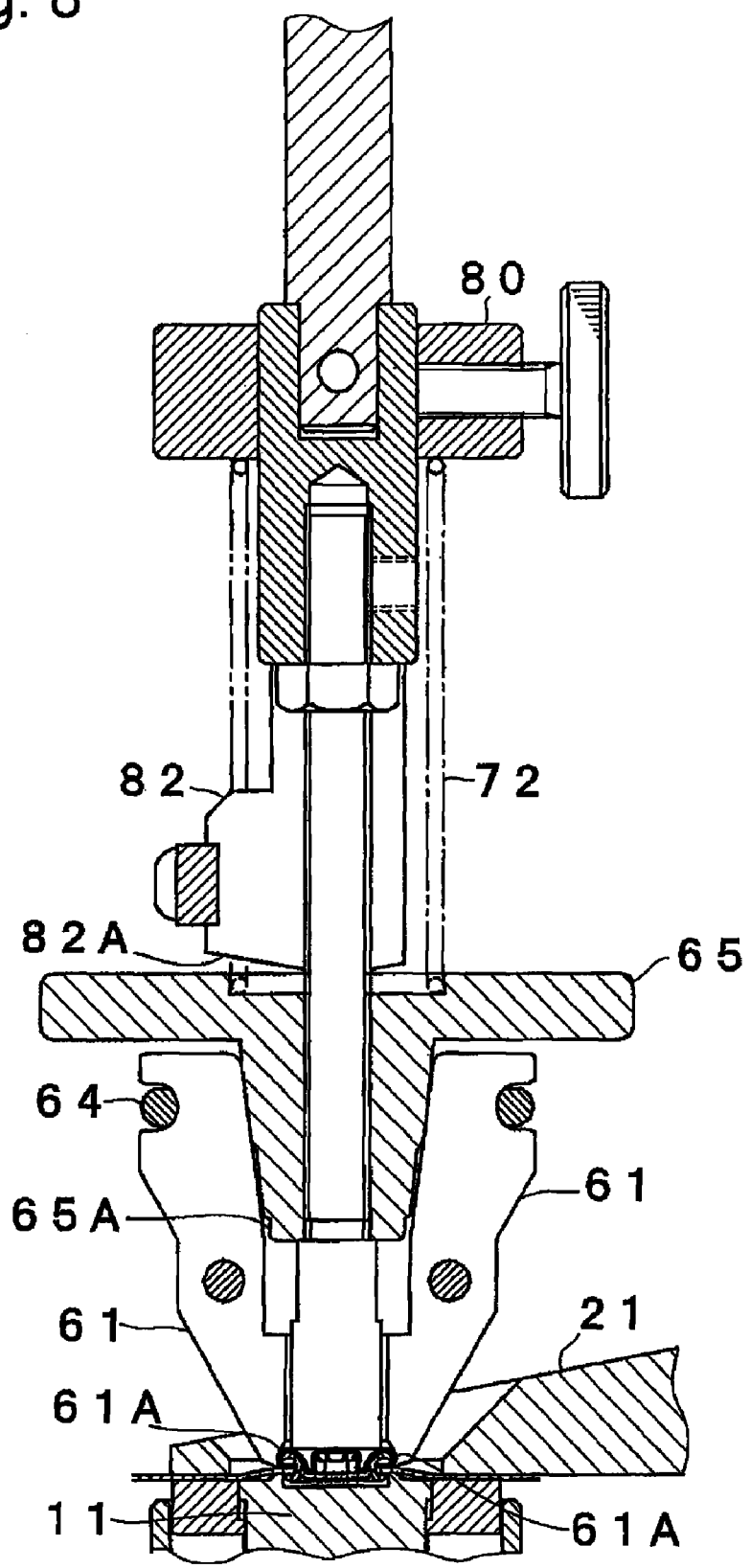
FIG. 8 is an explanatory side view showing a state after chucking the snap and after locked state.
Figure 11:
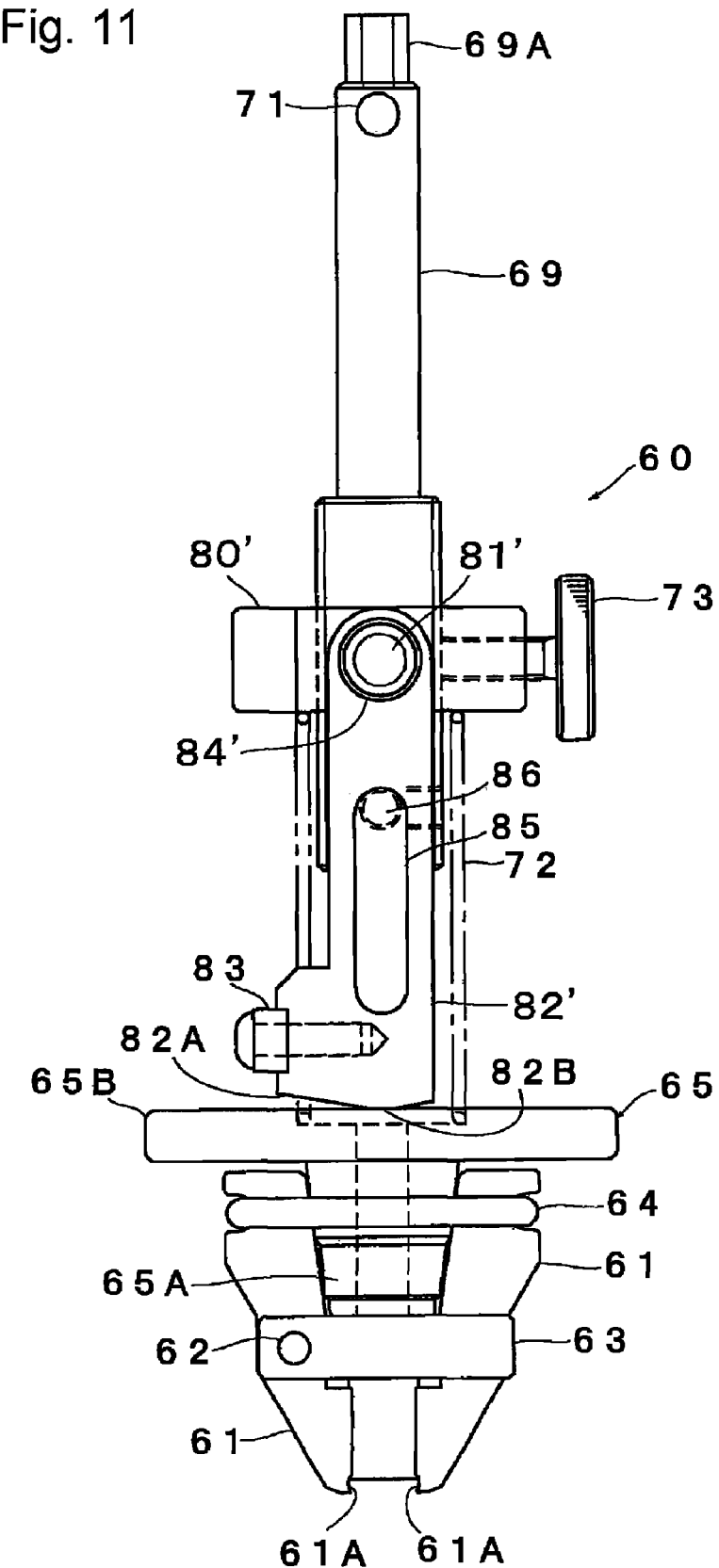
FIG. 11 is a side view of another embodiment of the snap chucking unit.
Figure 12:
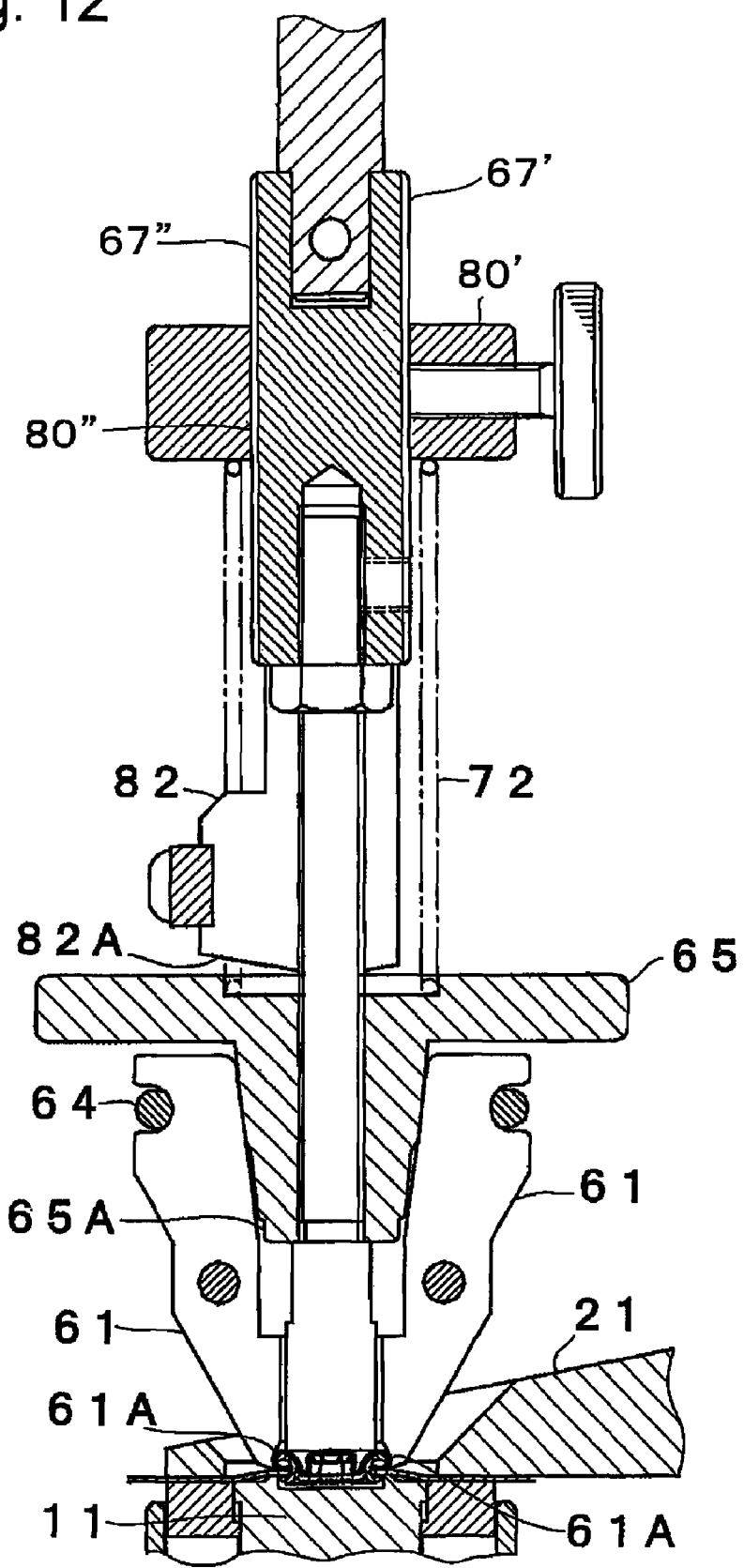
FIG. 12 is an explanatory side view of the embodiment in FIG. 11.

As an alternative to the above-mentioned arm diameter adjuster, it is possible to vary the degree of the arm 82 pushing down the collar 65B in the locked position or the degree of the jaw chucking portion 61A chucking a snap by adjusting the position of the center of the turning of the arms (82), namely, the center of the support shaft 81 with respect to the collar 65B without changing the arm radius of the arm 82. For instant, as shown in FIGS. 11 and 12 (The same numerals as in FIGS. 3 and 8 are used in FIGS. 11 and 12 except for the following different points (67', 67", 80', 80", 81', 82', 84')), the turning arms 82' are supported by the supportive shafts 81' through a circular opening 84' of each arm 82' in place of the opening 84 including the circular open portions 84A, 84B and 84C. Further, the rod coupling member 67' has an external thread 67" on its external surface, and the lock mechanism support plate 80' has a bore with an internal thread 80" through which the rod coupling member 67' can be threadably inserted. By threadably rotating the member 67' in one direction or the other direction, it is possible to displace the position of the supportive shafts 81' downward or upward, which can adjust the position of the support shaft 81' with respect to the collar 65B. The lock mechanism support plate 80' can be fixed to the rod coupling member 67' by rotating and fastening the position fixing screw 73 mounted to the plate 80' with respect to the rod coupling member 67' after displacing the supportive shafts 81' downward or upward.

Figure 7:
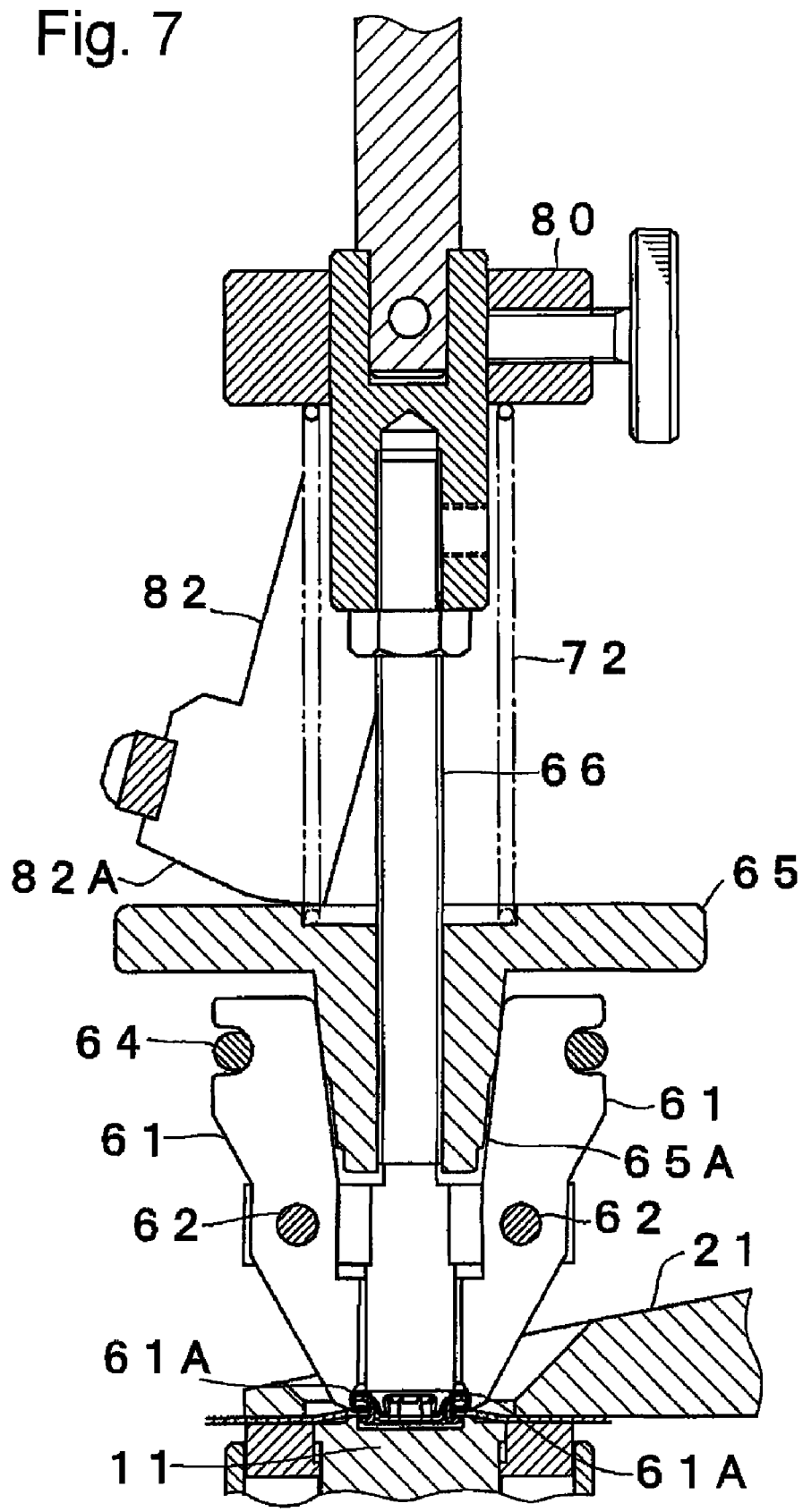
FIG. 7 is an explanatory side view showing a state after chucking the snap and before locked state.
Figure 9:
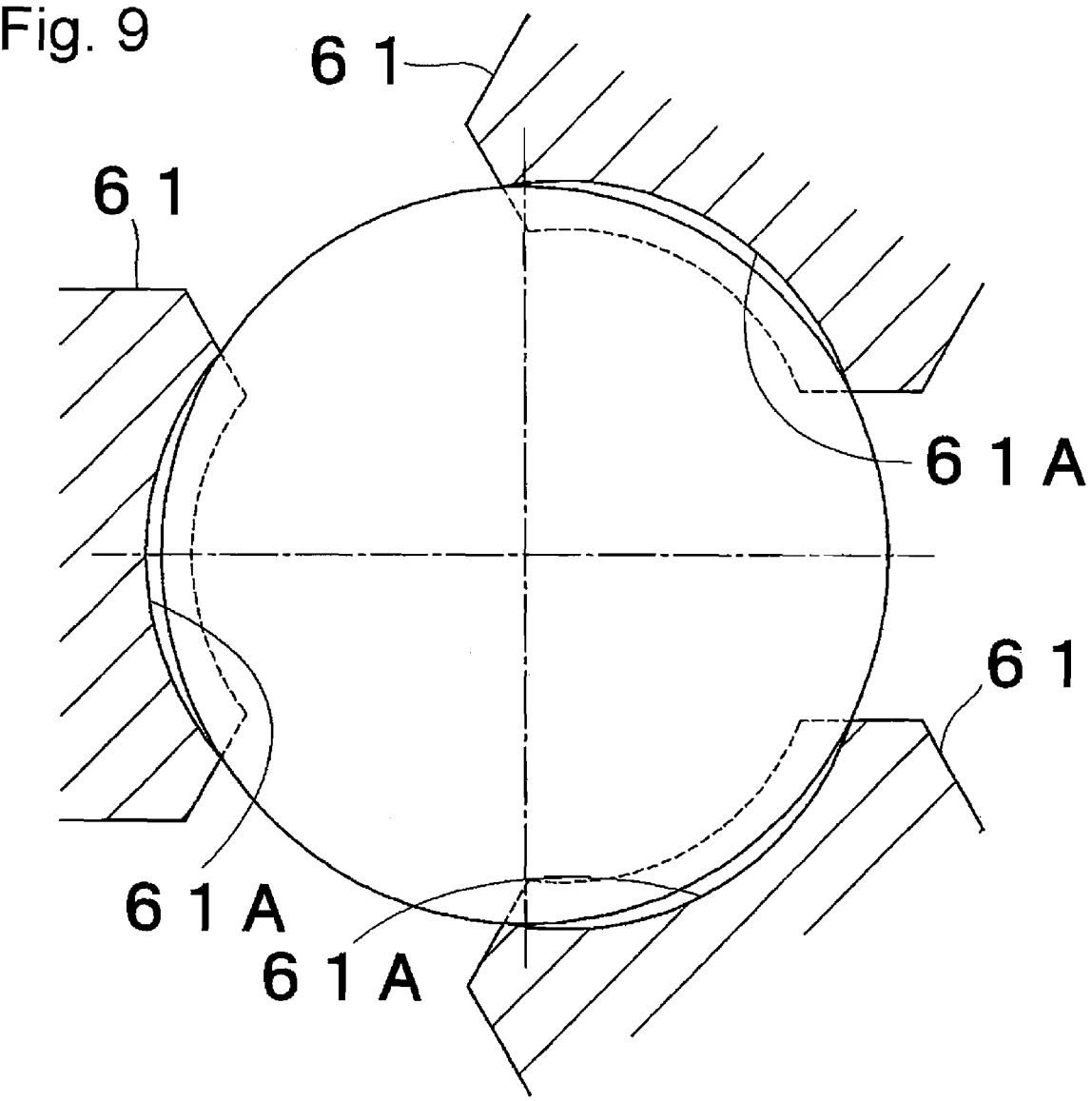
FIG. 9 is an explanatory plan view showing how a snap member is chucked by jaw chucking portions in the locked state in FIG. 8.

Next, a snap member detaching force measurement method according to the present invention will be explained in connection with how the snap member detaching force measurement device having the above-mentioned configuration is used. First, the snap member attached to the cloth is mounted on the die 11, and part of the cloth around the snap member is held onto the die 11 by the cloth holding arm 21 of the cloth holding unit 20. Then, the jaw open/close driving member 65 is put down from the state where the jaw chucking portions 61A are placed at a distance from the side portion of the snap member (see FIG. 6) to the state where the jaw chucking portions 61A chuck the snap side portion by the elastic force of the spring 72 alone (see FIG. 7). In the latter state, if torque is applied to the snap member, there may be caused a problem that the jaw chucking portions 61A slip on the snap side portion or the chucking force by the spring 72 varies. Thus, the turning arms 82 of the lock mechanism are turned to the above-mentioned locked positions (see FIG. 8). In this manner, the tapered portion 65A of the jaw open/close driving member 65 is slightly pushed down, and the jaw chucking portions 61A chucking the snap member by the spring force slightly displace radially inwardly, allowing the jaw chucking portions 61A to firmly tighten the snap member with constant chucking force while reinforcing the spring force (locked state). FIG. 9 shows how the side portion of the snap member is chucked by the chucking portions 61A of the three jaws 61 in this locked state. As shown in FIG. 9, each chucking portion 61A has an arc-shaped surface facing the snap side portion. The diameter of the arc of the arc-shaped surface is slightly smaller than the snap diameter, so that the both ends of each arc-shaped surface in a horizontal plane can bite into the snap side portion, which serves as resistance to prevent the chucking portions 61A from slipping on the snap side portion during the torque application. To provide such resistance, it also possible to make the arc-shaped surfaces of the chucking portions 61A rough.

Then, in this locked state, the output portion 51 of the torque gauge 50 is connected to the joint 69A of the upper rod 69, and the operator manually turns the torque gauge 50 for a predetermined time and/or by a predetermined angle. As described above, this torque is transmitted to the jaw support plate 63 via the upper rod 69, the rod coupling member 67 and the lower rod 66, and then provided from the chucking portions 61A of the jaws 61 to the snap member. After the process of applying predetermined torque, that is, the process of applying rotation moment to the snap member around the an axial line vertical to the surface of the cloth, the tension unit 30 is actuated while the snap is being locked to pull the cloth downward and then measure this tensile force.

What is claimed is:

1. A snap chuck which chucks a snap member attached to cloth from its side portion, the snap chuck comprising:
a plurality of chucking members for chucking the side portion of the snap member by chucking portions of the chucking members; and
a lock mechanism which can lock, with constant chucking force, the state of the snap member chucked by the chucking portions of the chucking members,
wherein the lock mechanism includes chucking force adjustment device enabling the chucked state to be locked by chucking forces corresponding to a plurality of kinds of diameters of the snap members.

2. A snap chuck which chucks a snap member attached to cloth from its side portion, the snap chuck comprising:
a plurality of chucking members for chucking the side portion of the snap member by chucking portions of the chucking members; and
a lock mechanism which can lock, with constant chucking force, the state of the snap member chucked by the chucking portions of the chucking members,
wherein the lock mechanism includes a support shaft, and one or more arms which can turn centering around the support shaft between a state in which the arms are pushing the snap chucking device and a state in which the arms are not pushing the snap chucking device.

3. The snap chuck according to claim 2, the lock mechanism includes chucking force adjustment device adjusting the distance between the snap chucking device and the support shaft.

4. The snap chuck according to any one of claims 2, 3 and 1, comprising an elastic member which pushes the chucking portions of the chucking members against the side portion of the snap member, wherein the lock mechanism, in a locked state, can reinforce the force of the chucking portions to chuck the snap member by the elastic member.

* * * * *

UNITED STATES PATENT AND TRADEMARK OFFICE
CERTIFICATE OF CORRECTION

| | |
|---|---|
| PATENT NO. | : 7,905,151 B2 |
| APPLICATION NO. | : 12/606777 |
| DATED | : March 15, 2011 |
| INVENTOR(S) | : Toru Shimizu |

It is certified that error appears in the above-identified patent and that said Letters Patent is hereby corrected as shown below:

In column 6, line 53, delete "he" and insert -- the --, therefor.

In column 8, line 38, delete "the an" and insert -- the --, therefor.

Signed and Sealed this
Thirty-first Day of May, 2011

David J. Kappos
*Director of the United States Patent and Trademark Office*